Jan. 6, 1953 E. M. GARNER 2,624,551
UNDERREAMING ATTACHMENT FOR TRACTORS
Filed Aug. 14, 1950 2 SHEETS—SHEET 1
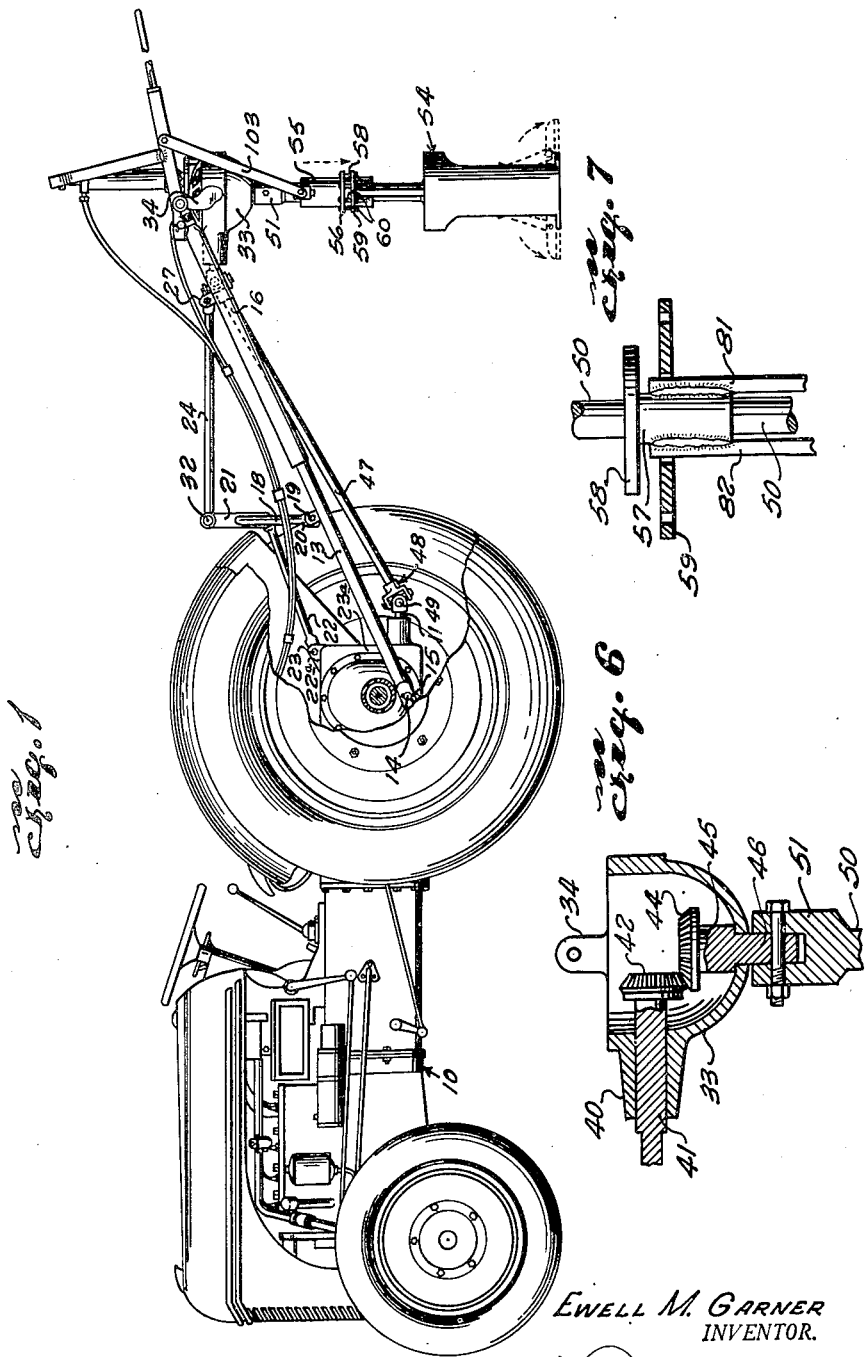
Ewell M. Garner
INVENTOR.
ATTORNEY Jan. 6, 1953     E. M. GARNER     2,624,551
UNDERREAMING ATTACHMENT FOR TRACTORS
Filed Aug. 14, 1950     2 SHEETS—SHEET 2
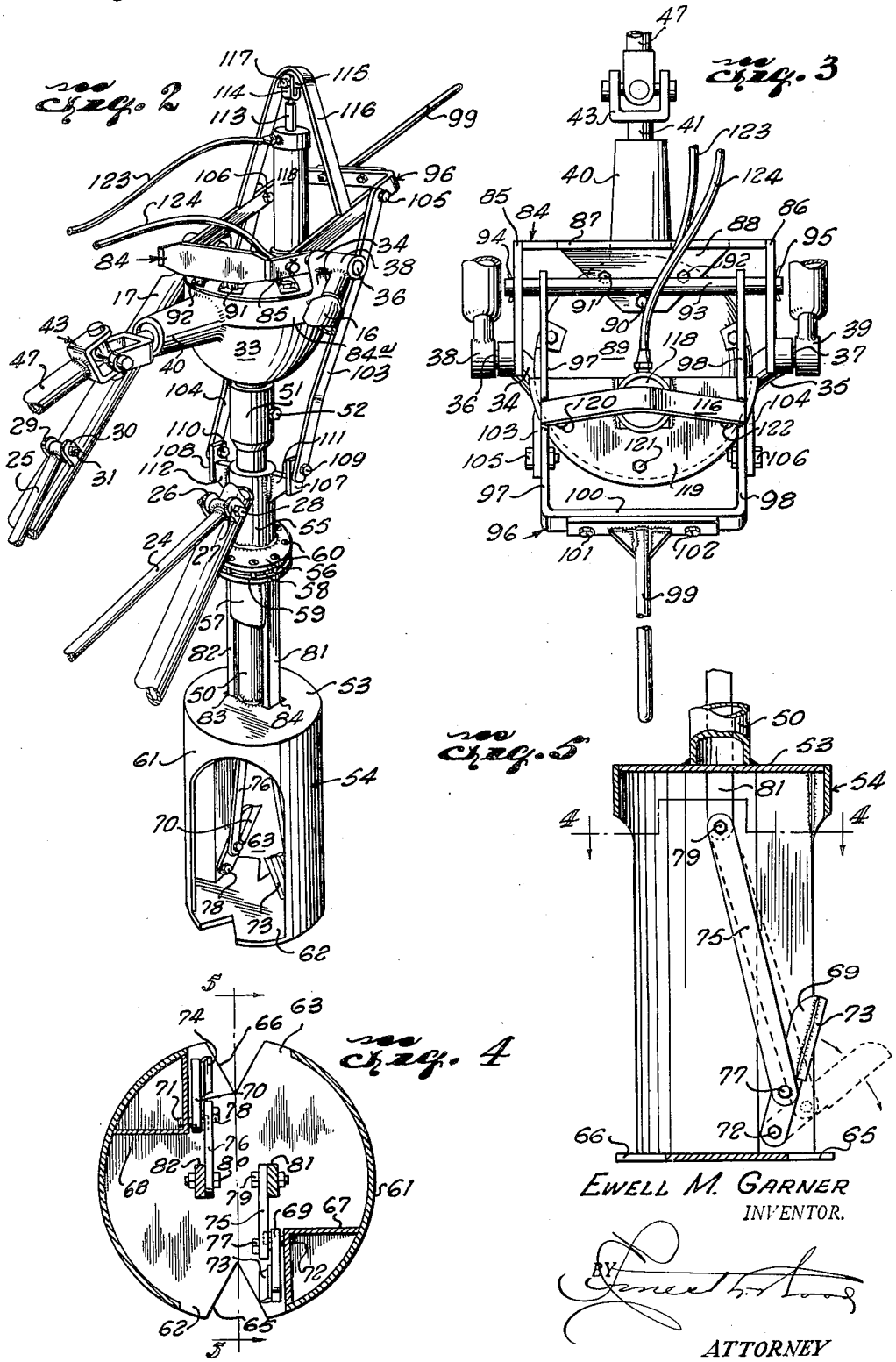
EWELL M. GARNER
INVENTOR.
ATTORNEY Patented Jan. 6, 1953

2,624,551

UNITED STATES PATENT OFFICE 2,624,551

UNDERREAMING ATTACHMENT FOR TRACTORS

Ewell M. Garner, Dallas, Tex.

Application August 14, 1950, Serial No. 179,324

5 Claims. (Cl. 255—76)

This invention relates to underreamers and more particularly to underreamers adapted to be attached to the power take-offs of tractors or other self powered equipment.

In various excavation operations, holes are bored in the earth for piers of concrete or similar material. It is desirable that the bottom portions of the holes be enlarged to provide an enlarged footing for the pier to increase the bearing surface. Moreover, it is desirable that the underreamer employed to enlarge the bottom portions of the hole be easily attached to the power take-off of a tractor or other powered equipment.

Accordingly, it is an object of my invention to provide a new and improved underreamer.

It is another object of my invention to provide a new and improved underreamer which can be easily attached to the power take-off of a tractor or other self powered equipment.

It is another object of my invention to provide a new and improved underreamer which can be easily attached to the power take-off and lifting arms of a tractor or other self powered equipment in such manner that rotation of the underreamer need not be interrupted during movement of the underreamer into and out of a bore hole or from one hole to another.

Briefly stated, my new and improved underreamer is adapted to be attached to the power take-off and lifting arms of a tractor and comprises a barrel adapted to be lowered into a hole bored into the earth. The barrel is driven by the power take-off of a tractor through a transmission supported on the tractor by means of booms pivotally secured to the tractor. The booms are connected to the lift arms of the tractor by a suitable mechanical linkage to enable the barrel to be moved into and out of the holes by operation of the lift arms. The barrel is provided with a pair of oppositely disposed apertures through which are adapted to extend arms pivotally secured within the barrel. A suitable mechanical linkage which may be operated either manually or hydraulically is provided to selectively move the arms into positions wherein the blades are disposed within the barrel or extend through the apertures and beyond the outer surface of the barrel. The arms are provided with blades which enlarge the bottom portions of the holes when the barrel is rotated.

For a better understanding of my invention, reference may be had to the following description taken in connection with the accompanying drawing and its scope will be pointed out in the appended claims.

In the drawing,

Figure 1 is a side view of a tractor illustrating the manner of attachment of a preferred embodiment of my new and improved underreamer to the power take-off and lifting arms of the tractor, parts of the tractor being broken away to disclose the manner of attachment;

Figure 2 is a perspective view of the underreamer showing the operating mechanical linkages;

Figure 3 is a top plan view of the portion of the underreamer mechanical linkage shown in Figure 2;

Figure 4 is a sectional view of the underreamer taken on line 4—4 of Figure 5;

Figure 5 is a sectional view of the underreamer taken along line 5—5 of Figure 4;

Figure 6 is a fragmentary sectional view of the transmission; and

Figure 7 is a plan view of a portion of the arm actuating linkage, showing one element in cross-section.

Referring now to the drawing, a preferred embodiment of the underreamer of my invention is shown attached to a tractor 10 provided with a power take-off 11 and a pair of lift arms which are telescoped in the ends of hollow booms 13, only one of which can be seen in Figure 1. A pin 14 may be provided for each boom 13 and its associated lift arm to maintain the booms 13 secured to the lifting arms of tractor 10. A cotter key 15 may be provided to prevent each pin 14 from falling out of engagement with the power lift arms and booms 13. Tubular extensions 16 and 17 telescope over the free ends of booms 13.

In order to provide a bracing or stabilizing effect on booms 13 and extensions 16 and 17 while allowing limited telescoping movement of extensions 16 and 17 relative to booms 13, I provide a linkage comprising a U-shaped member 18 whose ends are pivotally secured to booms 13 by means of pins 19 secured in brackets 20 which are rigidly secured, by welding or other suitable means, to booms 13 intermediate their ends. A bar 21 is rigidly secured, intermediate its ends, to the bight portion of U-shaped member 18. A bar 22 has one end pivotally connected to one each of bar 21 and has its other end pivotally connected to a lug 22a by means of a shaft 23. Lug 22a is rigidly secured to tractor housing 23a. The tubular extensions 16 and 17 are connected to the other end of bar 21 by members 24 and 25, respectively. The member 24 is pivotally connected to tubular extension 16 by means of ears 26 and 27 which are rigidly secured to extension 16 and a pin 28 which extends through suitable registering apertures in ears 26 and 27 and member 24. The member 25 is similarly pivotally connected to extension 17 by means of ears 29 and 30 rigidly secured to extension 17 and a pin 31 which extends through registering apertures in ears 29 and 30 and member 25. The other ends of members 24 and 25 are pivotally secured to the other end of bar 21, opposite the connection thereto of the bar 22, by means of a pin on shaft 32.

A gear housing 33 is pivotally secured to tubular extensions 16 and 17 by means of upstanding extensions 34 and 35 integral with housing 33. The extensions 34 and 35 are provided with outwardly extending pins 36 and 37, respectively, which are disposed in bearing blocks 38 and 39, respectively, rigidly secured by welding or other suitable means to tubular extensions 16 and 17, respectively. Housing 33 is provided with a sleeve 40 through which extends a shaft 41 to whose inner end is rigidly secured a gear 42 while its other end is connected to a conventional universal joint 43. Gear 42 meshes with a gear 44 rigidly secured to a shaft 45 having a reduced end 46. The shaft 44 is connected to power take-off 11 by means of universal joint 43, drive shaft 47 and universal joint 48.

The structure described thus far is of conventional design such as is generally provided for driving a vertical shaft, such as shaft 45 to which a tool may be secured, from the power take-off 11 of a tractor 10. As the booms 13 move about a pivot point which coincides with the pivot point 49 about which the driving shaft 47 is rotatable, the stabilizing or bracing linkage which is connected to tubular extensions 16 and 17 must permit longitudinal movement of extensions 16 and 17 with respect to booms 13. Booms 13 being connected to the power lift arms of tractor 10, the transmission housing 33 can be moved vertically by moving the usual power lift arms of tractor 10 about their pivotal axis.

The new and improved underreamer which is driven by shaft 45 comprises a tubular shaft 50 having an enlarged upper end 51 in which is disposed the reduced end 46 of shaft 45. A bolt 52 extends through registering apertures in end 51 and reduced end 46 to detachably secure shafts 45 and 50 together. The lower end of tubular shaft 50 is secured to the top 53 of the barrel 54 by welding or any other suitable means. Slidably disposed on tubular shaft 50 is a sleeve 55 which is provided at its lower end with an outwardly extending flange 56. Flange 56 may be secured to sleeve 55 by welding or in any other suitable manner.

Also slidably disposed on tubular shaft 50 is a sleeve 57 to which is rigidly secured an outwardly extending flange 58 which is of smaller diameter than flange 56 An annular member 59 of substantially the same diameter as flange 56 is disposed about sleeve 57. Annular member 59 and flange 56 are disposed on opposite sides of flange 58 and are secured together by means of bolts 60 which extend through registering apertures in flange 56, and annular member 59. The bolts 60 secure the annular member 59 to flange 56 but permit rotary movement of flange 58, and therefore sleeve 57, with respect to sleeve 55. It will be apparent then that sleeve 57 will move vertically in accordance with the vertical movement of sleeve 55 but will be free to rotate about its vertical longitudinal axis even when sleeve 55 is held against rotary movement about its vertical axis.

Barrel 54 is provided with a cylindrical wall 61 having a pair of oppositely disposed apertures 62 and 63. A bottom 64 provided with notches 65 and 66 extending from apertures 62 and 63, respectively is rigidly secured to cylindrical wall 61. Supporting angle members 67 and 68 are rigidly secured to wall 61 within barrel 54 and adjacent apertures 62 and 63, respectively. A pair of arms 69 and 70 are pivotally secured to angle members 67 and 68, respectively, by means of bolts 71 and 72, respectively, and are disposed to project outwardly through apertures 62 and 63, respectively, when pivoted toward horizontal positions. Arms 69 and 70 are provided with blades 73 and 74, which are welded to arms 69 and 70, respectively, and which are adapted to dislodge earth from the bottom portion of the hole in which barrel 54 is disposed when they are pivoted toward their horizontal positions.

In order selectively and simultaneously to pivot arms 69 and 70 toward and away from their horizontal positions, I provide a pair of links 75 and 76 whose lower ends are pivotally attached to arms 69 and 70, respectively, intermediate their ends by means of bolts 77 and 78, respectively. The upper ends of links 75 and 76 are pivotally secured by means of bolts 79 and 80, respectively, to the lower ends of bars 81 and 82 which extend through apertures 83 and 84 provided in top 53 adjacent opposite sides of tubular shaft 50. The upper ends of bars 81 and 82 are rigidly secured to sleeve 57 by welding or in any other conventional manner. It will now be apparent that the arms 69 and 70 may be pivoted outwardly toward their horizontal positions by lowering sleeve 55 since this will result in lowering of sleeve 57 and outward pivoting about bolts 79 and 80 of links 75 and 76, respectively.

In order selectively to move sleeve 55 vertically along tubular shaft 50, I provide a mechanical linkage which comprises a bracket 84a whose arms 85 and 86 are rigidly secured to upstanding extensions 34 and 35, respectively, of the gear casing 33. The connecting portion 87 is provided with an extension 88 which is secured to the gear housing top 89 by bolt 90 which engages in a threaded hole in top 89 and by bolts 91 and 92 which extend through suitable apertures in top 89 into threaded apertures in gear housing 33. Bolts 91 and 92 serve to secure both extension 88 and top 89 to gear housing 33. A shaft 93 is rotatably secured in registering apertures in arms 85 and 86 of bracket 84 and is held in place by cotter keys 94 and 95. A handle bracket 96 has arms 97 and 98 whose ends are rigidly secured to shaft 93. A handle 99 is rigidly secured to the connecting portion 100 of bracket 96 by means of bolts 101 and 102. A pair of levers 103 and 104 have their upper ends pivotally secured to arms 97 and 98 of bracket 96 by means of bolts 105 and 106, respectively. The lower ends of levers 103 and 104 are pivotally secured to plates 107 and 108 by bolts 109 and 110, respectively. The plates 107 and 108 are rigidly secured to sleeve 55 by extensions 111 and 112, respectively, which are welded to sleeve 55.

In operation, the tractor 10 is maneuvered to a position in which the barrel 54 is disposed above a hole bored in the earth by a conventional auger. The booms 13 are then lowered by suitable movement of the lift arms of tractor 10 to place barrel 54 in the hole with the bottom 64 of barrel 54 resting on the bottom of the hole. The shaft 11 of the power take-off of the tractor is then set in rotation to rotate barrel 54. As barrel 54 rotates, a downward force is exerted on handle 99 whereby bracket 96 is pivoted about shaft 93. This causes a downward force to be exerted on levers 103 and 104 and causes sleeves 55 and 57 to slide downwardly on tubular shaft 50. As a result the links 75 and 76 cause arms 69 and 70 to pivot about bolts 71 and 72, respectively of the gear casing 33, and the blades 73 and 74 are moved outwardly through apertures 62 and 63 of wall 61 to dig into the earth adjacent the bottom portion of the earth. The dislodgment of the earth causes an enlargement of the bottom portion of the hole. After the arms 69 and 70 are moved to their horizontal positions, handle 99 is lifted and arms 69 and 70 are pivoted inwardly into barrel 54. The shaft 11 continues to rotate while the barrel 54 is lifted out of the hole by the lift arms of tractor 10 hence it becomes unnecessary to stop the machine while moving the underreamer into and out of the hole or from one hole to another. During the rotation of barrel 54 a large portion of the dislodged earth moves into barrel 54 and is removed when barrel 54 is moved out of the hole by movement of the lift arms of tractor 10. The notches 65 and 66 in bottom 64 serve to move into barrel 54 any loose earth present on the bottom of the hole.

If desired, the bracket 96 may be moved by a hydraulic system powered by the tractor motor. In this case, a conventional hydraulically actuated piston 113 is provided with a two legged bracket 114 secured to the web 115 of a substantially V-shaped bracket 116 by means of a bolt 117. Sufficient play is provided between bracket 114, bolt 117 and web 115 so that bracket 116 may move to an angular position with respect to piston 113 as illustrated in Figure 1. The hydraulic cylinder 118 is rigidly secured to a semi-circular plate 119 by welding or other suitable means. Plate 119 is rigidly secured to top 89 and gear housing 33 by bolts 120, 121 and 122 which extend through registering apertures in top 89 and housing 33. Flexible conduits 123 and 124 are connected to cylinder 118 and to any conventional valve controlled supply of fluid under pressure. When fluid under pressure passes into the top portion of cylinder 118, through conduit 123 while conduit 124 is opened to allow fluid from the lower portion of cylinder 118 to escape, piston 113 is moved downwardly moving bracket 116 downwardly. Since bracket 116 is rigidly secured to bracket 96, bracket 96 is pivoted downwardly about shaft 93 causing arms 96 and 97 to pivot outwardly. Conversely, when fluid under pressure passes through conduit 124 into the lower portion of cylinder 118 while conduit 123 is opened to allow the fluid in the upper portion of cylinder 118 to escape, bracket 116 is lifted and arms 69 and 70 pivot inwardly.

While I have illustrated and described a preferred embodiment of my invention, it will be apparent that various changes and modifications can be made without departing from my invention and I therefore, aim in the appended claims to cover all such changes and modifications as fall within the true spirit and scope of my invention.

What is claimed is:

1. In an underreamer, a barrel having a cylindrical wall provided with a pair of diametrically opposed apertures; a top and a bottom in said barrel, an angle member affixed in said barrel adjacent one side of each of said apertures, a pair of arms each pivotally secured at one end to each of said angle members and adapted to move pivotally outwardly through said apertures toward horizontal positions; a driving shaft rigidly secured to the top of said barrel; a sleeve slidably disposed on said driving shaft; a pair of parallel bars, one on each side of said driving shaft, said bars being affixed at their upper ends to opposite sides of said sleeve extending through openings in the top of said barrel and means pivotally connecting the lower ends of said bars and said arms for moving said arms to and from said horizontal positions upon sliding movement of said sleeve.

2. In an underreamer, a barrel having a cylindrical wall having an apertured top and a bottom and provided with a pair of diametrically opposed apertures; an angle member on one side of each of said apertures and defining a mounting surface, an arm pivotally secured to said mounting surface and adapted to move pivotally outwardly through said apertures toward horizontal positions; a driving shaft rigidly secured to the top of said barrel; a sleeve slidably disposed on said driving shaft; and means connecting said sleeve and said arms through said apertured top for moving said arms to and from said horizontal positions.

3. In an underreamer, a barrel having an apertured top and a bottom, an upwardly extending shaft connected to said top, said barrel having a cylindrical wall provided with a pair of oppositely disposed apertures; an angle member affixed to said cylindrical wall and defining a mounting surface parallel with one side of each of said recesses; an arm pivotally secured to each of said mounting surfaces and adapted to move pivotally outwardly through said apertures toward horizontal positions; a sleeve slidably disposed on said upwardly extending shaft; a mechanical linkage connecting said sleeve and said arms through said apertured top for moving said arms to and from said horizontal positions as said sleeve is moved vertically along said upwardly extending shaft.

4. A tool for underreaming earth holes comprising a barrel shaped to enter the hole and having oppositely disposed side slots; a shaft for rotating said barrel; a sleeve slidably disposed on said shaft; reamers arranged to work through said side slots; a pair of diametrically opposed angle members, one being disposed on one side of each of said side slots and defining a bearing surface for one of said reamers to which said reamer is pivoted, a mechanical linkage connecting said reamers and said sleeve for moving said reamers through said side slots upon vertical movement of said sleeve along said shaft; and means connected to said sleeve for imparting vertical movement to said sleeve while allowing rotation of said sleeve about a vertical axis.

5. In a tool for underreaming earth holes, a barrel shaped to enter the hole and having oppositely disposed side slots; a shaft for rotating said barrel; a sleeve slidably disposed on said shaft; reamers arranged to work through said side slots; oppositely disposed angle members, one being affixed in said barrel parallel with one side of each of said side slots and defining mountings for said reamers against which the latter bear in operation of said tool; a mechanical linkage connecting said reamers and said sleeve for moving said reamers through said side slots upon vertical movement of said sleeve along said shaft;

a second sleeve disposed about said shaft above said first mentioned sleeve; means connecting said sleeves for simultaneous vertical movement, said means allowing rotation of said first mentioned sleeve about a vertical axis while said second sleeve is stationary; and means for imparting vertical movement to said second sleeve.

EWELL M. GARNER.

REFERENCES CITED

The following references are of record in the file of this patent:

UNITED STATES PATENTS

| Number | Name | Date |
|---|---|---|
| 184,977 | McCair et al. | Dec. 5, 1876 |
| 1,731,732 | Terrell | Oct. 15, 1929 |
| 1,970,063 | Steinman | Aug. 14, 1934 |
| 2,139,323 | Zum-Berge | Dec. 6, 1938 |
| 2,176,410 | Ruddell et al. | Oct. 17, 1939 |
| 2,286,583 | Shoup | June 16, 1942 |
| 2,320,775 | Garner | June 1, 1943 |
| 2,468,319 | Adams | Apr. 26, 1949 |